(No Model.)
J. T. KENWORTHY, D. SEXTON & A. THOMPSON.
APPARATUS FOR TRANSFERRING LIQUIDS.
No. 352,695. Patented Nov. 16, 1886.
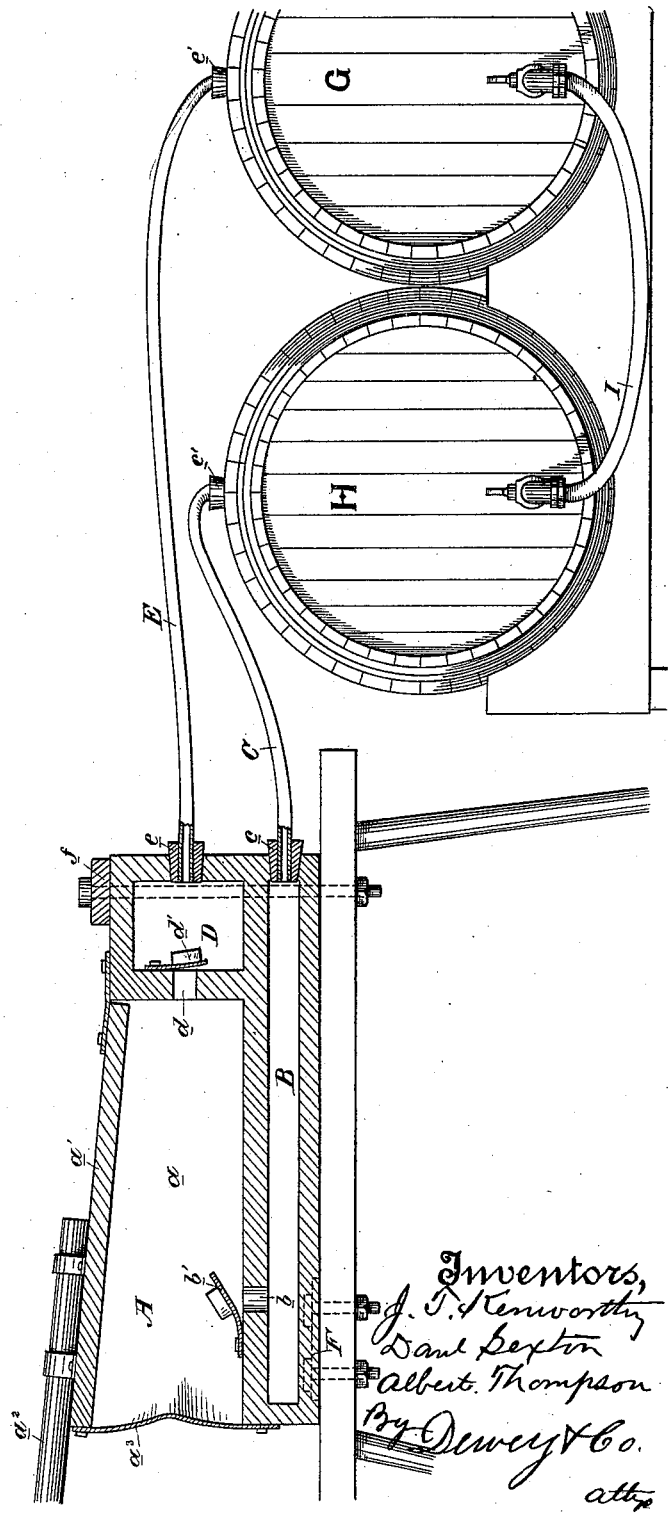

UNITED STATES PATENT OFFICE.

JAMES T. KENWORTHY, DANIEL SEXTON, AND ALBERT THOMPSON, OF COLTON, CALIFORNIA.

APPARATUS FOR TRANSFERRING LIQUIDS.

SPECIFICATION forming part of Letters Patent No. 352,695, dated November 16, 1886.

Application filed August 11, 1886. Serial No. 210,643. (No model.)

*To all whom it may concern:*

Be it known that we, JAMES T. KENWORTHY, DANIEL SEXTON, and ALBERT THOMPSON, of Colton, county of San Bernardino and State of California, have invented an Improvement in Apparatus for Transferring Liquids; and we hereby declare the following to be a full, clear, and exact description thereof.

Our invention relates to a new and useful apparatus for transferring liquids from one receptacle to another; and our invention consists in a bellows provided with inlet and outlet ports and controlling-valves, separate passages or tubes connected with the ports, and separate pipe or hose connections from said passages or tubes to the liquid-receptacles, all of which we shall hereinafter fully describe.

The object of our invention is to provide a simple and effective apparatus, the particular use of which is for racking wines and other liquors, though it may be applied to other purposes, such as the elevating of water, &c.

Referring to the accompanying drawing, the figure is a longitudinal vertical section of the bellows and an end elevation of the casks, the whole showing the complete apparatus.

A is the bellows, provided with a bellows-chamber, $a$, formed by the hinged and movable top $a'$, having the handle $a^2$ and the inclosing flexible material $a^3$, all arranged after the manner of an ordinary bellows. In the base of the chamber is the inlet-port $b$, controlled by an upwardly-swinging valve, $b'$. With this port a passage or tube, B, leading in from the forward end of the bellows and through its base, communicates, whereby a close-fitting connection may be readily made with a flexible hose, C, the end of which is provided with a hollow plug, $c$, by which it is inserted in the forward end of passage B. In the front wall of the bellows-chamber is made the outlet-port $d$, which is controlled by an outwardly-swinging valve, $d'$. With this port communicates the tube or passage D, leading through to the front end of the bellows and receiving the tight plug-connection $e$ of the flexible hose E, as shown. The bellows and connections are to be made light enough to be readily transported. Irons F are secured to the base of the bellows, and a cross-piece, $f$, is attached to its top front, whereby it may readily be screwed to a bench when at work.

G is a full cask of wine, and H is an empty cask. The faucets of these casks are connected by a hose or pipe, I. The free end of hose E, from the passage D, connected with the outlet-port of the bellows, is fitted closely into the bung-hole of the full cask by means of the perforated plug $e'$. The free end of the hose C, from the passage B of the inlet-port, is similarly fitted by its perforated plug $c'$ into the bung-hole of the empty cask.

The apparatus is now ready for operation. On the downstroke of the bellows the air in the chamber $a$ is forced out through the port $d$, passage D, and hose E into the full cask. On the upstroke the air from the empty cask is drawn into the pump through the hose C, passage B, and inlet-port $b$. On the downstroke again, this air is now forced into the full cask, and on the next stroke more air is drawn from the empty cask. In this way we create a vacuum in the empty cask, and the air which is taken therefrom, instead of being exhausted into the atmosphere, is utilized by forcing it in upon the wine in the full cask. The passage of wine through the faucet-connection I is therefore certain and rapid.

Having thus described our invention, what we claim as new, and desire to secure by Letters Patent, is—

1. In an apparatus for effecting the transfer of liquids from one receptacle to another, the bellows A, having chamber $a$, the inlet-port $b$, with its controlling-valve $b'$, and the outlet-port $d$, with its controlling-valve $d'$, in combination with a tube or passage, B, communicating with the inlet-port $b$, and the tube or passage D, communicating with the outlet-port $d$, whereby said ports may be readily connected with the receptacles, substantially as described.

2. In an apparatus for effecting the transfer of liquids from one receptacle to another, consisting of the bellows A, having the chamber $a$, the inlet-port $b$ and valve $b'$ in the base of the chamber, the outlet-port $d$ and valve $d'$ in the front of the chamber, the hose C, connected with one receptacle, and the hose E, connected with the other receptacle, the tube or passage B, connecting the hose C with the inlet-port $b$, and the tube or passage D, connecting the hose E with the outlet-port $d$, substantially as described.

3. An apparatus for effecting the transfer of liquids from one receptacle to another, comprising the full vessel G, the empty vessel H, the pipe I, connecting them, the bellows A, having the inlet valved port $b$ and the outlet valved port $d$, the passage or tube B, communicating with the inlet-port, the passage or tube D, communicating with the outlet-port, the hose C, connecting vessel H with the passage B of the inlet-port, and the hose E, connecting vessel G with the passage D of the outlet-port, all arranged and adapted to operate substantially as herein described.

In witness whereof we have hereunto set our hands.

JAMES T. KENWORTHY.
DANIEL SEXTON.
ALBERT THOMPSON.

Witnesses:
JOHN HALCROW,
BERNARD HARVEY.